United States Patent [19]
Holzmann et al.

[11] Patent Number: 5,980,618
[45] Date of Patent: Nov. 9, 1999

[54] AIR FILTER WITH FAILSAFE FILTERED PRESSURE TAP

[75] Inventors: Mark V. Holzmann; Jeffrey S. Morgan; Andrew J. Harris, all of Stoughton, Wis.

[73] Assignee: Nelson Industries, Inc., Stoughton, Wis.

[21] Appl. No.: 09/037,248

[22] Filed: Mar. 9, 1998

[51] Int. Cl.⁶ .......................... B01D 46/00; B01D 46/44
[52] U.S. Cl. .................. 96/421; 55/310; 55/482
[58] Field of Search .............. 55/309, 310, 482, 55/385.3; 961/421; 95/19, 286

[56] References Cited

U.S. PATENT DOCUMENTS

| | | | |
|---|---|---|---|
| 1,246,189 | 11/1917 | Vanderlip . | |
| 1,351,573 | 8/1920 | Hopwood . | |
| 1,614,770 | 1/1927 | Ayling . | |
| 2,384,360 | 9/1945 | Allen et al. . | |
| 2,980,204 | 4/1961 | Jordan . | |
| 3,152,476 | 10/1964 | Criner | 96/421 |
| 3,363,616 | 1/1968 | Baumgarten . | |
| 3,384,109 | 5/1968 | Stroburg et al. . | |
| 3,422,679 | 1/1969 | McGowan et al. | 96/241 |
| 3,443,365 | 5/1969 | Lee et al. | 96/421 |
| 4,020,783 | 5/1977 | Anderson et al. | 96/421 |
| 4,179,762 | 12/1979 | Barnhardt et al. . | |
| 4,186,909 | 2/1980 | Patel . | |
| 4,637,825 | 1/1987 | Howeth . | |
| 4,702,754 | 10/1987 | Blocker | 96/421 |
| 5,016,923 | 5/1991 | Adamaitis . | |
| 5,275,636 | 1/1994 | Dudley et al. | 96/421 |
| 5,408,977 | 4/1995 | Cotton . | |
| 5,456,834 | 10/1995 | Bowlsbey . | |
| 5,525,215 | 6/1996 | Marchionda . | |
| 5,882,367 | 3/1999 | Morgan et al. | 55/495 |

*Primary Examiner*—Duane S. Smith
*Attorney, Agent, or Firm*—Andrus, Sceales, Starke & Sawall

[57] ABSTRACT

An air filter (10) is provided by a housing (12) having an air inlet (26) and an air outlet (28), a main filter element (30) in the housing, a plastic outlet tube (44) having a sidewall (60) with a pressure tap opening (62) therethrough, a metal fitting (68) in the pressure tap opening and affixed to the plastic outlet tube, for receiving a pressure sensor connector (70), and an auxiliary filter element (74, 90) in the pressure tap opening (62) and affixed to the plastic outlet tube (44) and unaffixed to the metal fitting (68) such that the auxiliary filter element (74, 90) remains in the pressure tap opening (62) if the metal fitting (68) becomes dislodged from the plastic outlet tube (44) and falls out of the pressure tap opening (62), such that the auxiliary filter element (74, 90) continues to protect the clean side (38) of the main filter element (30) and eliminates a possible contaminating bypass thereto through the pressure tap opening (62).

16 Claims, 2 Drawing Sheets

AIR FILTER WITH FAILSAFE FILTERED PRESSURE TAP

BACKGROUND AND SUMMARY

The invention relates to air filters, including for internal combustion engines, and more particularly to an air filter with a failsafe filtered pressure tap.

Air filters are known in the prior art, and typically include a cylindrical housing having distally opposite axial ends, and a cylindrical main filter element in the housing, the main filter element having an annular sidewall with a hollow interior and extending between distally opposite axial ends. Air flows radially inwardly through the annular sidewall of the filter element into the hollow interior and then axially through the hollow interior and exits the housing. An outlet tube extends from the air outlet of the housing and conducts air therefrom. The outlet tube has a sidewall with a pressure tap opening therethrough communicating between the interior and exterior of the outlet tube, for sensing pressure in the outlet tube. A fitting is provided in the pressure tap opening for receiving a pressure sensor connector. The fitting typically includes an auxiliary filter element affixed thereto to prevent contamination of the interior of the outlet tube and the clean side of the main filter element.

In continuing development efforts directed toward weight and/or cost reduction, metal components are increasingly being replaced by plastic components, including housings and/or outlet tubes. In the case of a plastic outlet tube, a problem exists creating possible exposure of the interior of the outlet tube and the clean side of the main filter element to contamination from the pressure tap opening. The noted fitting in the pressure tap opening is typically metal and typically is internally threaded for receiving a pressure sensor connector. When not in use, the connector is removed, and the pressure tap opening is closed by a plug or bolt threaded into the fitting. The metal fitting is typically externally knurled, and is pressfit or sonically welded to the plastic outlet tube. When the pressure sensor connector or the plug is tightened into the metal fitting, it is possible to overtorque the latter and twist it out of or at least loosen it from the opening in the plastic outlet tube, due to the lower tensile strength of the plastic. In this manner, the metal fitting can fall out or otherwise become detached from the plastic outlet tube, which in turn creates a contaminating bypass through the pressure tap opening into the interior of the plastic outlet tube and the clean side of the main filter element.

The present invention addresses and solves the above noted problem and eliminates the possible contaminating bypass through the pressure tap opening to the interior of the plastic outlet tube and the clean side of the main filter element. Instead of affixing the auxiliary filter element to the metal fitting or otherwise making the auxiliary filter element part of the fitting, the auxiliary filter element is instead affixed to the plastic outlet tube in the pressure tap opening. The auxiliary filter element remains in the pressure tap opening if the metal fitting becomes dislodged from the plastic outlet tube and falls out of the pressure tap opening, such that the auxiliary filter element continues to protect the clean side of the main filter element and eliminates a possible contaminating bypass thereto through the pressure tap opening.

DETAILED DESCRIPTION

Figure 1:
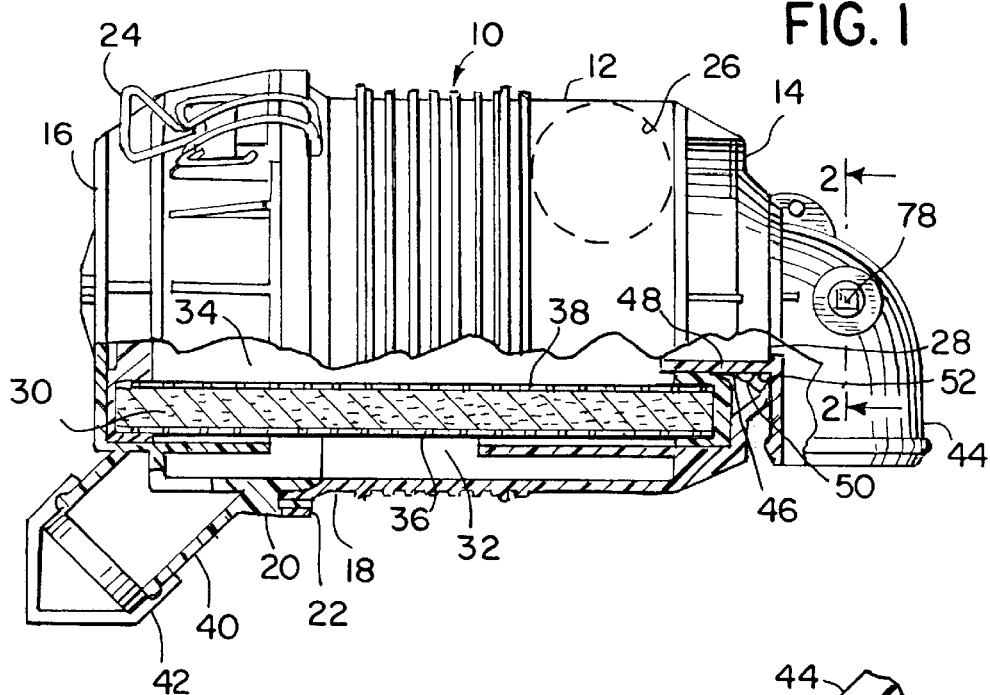
FIG. 1 is a side elevation view, partly cut away, of an air filter constructed in accordance with the invention.

FIG. 1 shows an air filter 10 including a generally cylindrical plastic housing 12 having distally opposite ends 14 and 16. The housing is provided by first and second sections 18 and 20 engaging each other at tongue and groove interface 22 and mounted to each other by a pair of diametrically opposite clamps, one of which is shown at 24. The housing has an air inlet as shown in dashed line at 26 into the sidewall of the housing, and an air outlet 28 at axial end 14 of the housing. A cylindrical main filter element 30 in the housing passes air from air inlet 26 to air outlet 28. Air flows from inlet 26 into the annular space 32 between the housing sidewall and the main filter element 30, then radially inwardly through the annulus of filter element 30 into the hollow interior 34 thereof, then axially rightwardly to outlet 28. Main filter element 30 has a dirty side 36 receiving air from inlet 26 through annular space 32, and has a clean side 38 passing air into hollow interior 34 to outlet 28. The housing has a drain outlet 40 closed by dust ejector valve 42, as is known.

A plastic outlet tube 44, preferably in the form of a 90° elbow, though other configurations may be used, is mounted to right axial end 14 of the housing at air outlet opening 28 in snap-in rotatable relation, as known in the prior art, for example as shown in commonly owned co-pending U.S. application Ser. No. 08/883,047, filed Jun. 26, 1997, now U.S. Pat. No. 5,882,367, incorporated herein by reference. As shown in such application, member 44 is inserted axially leftwardly into housing 12 until outer wedge shaped lip 46 on inner tubular portion 48 of member 44 moves past inner annular lip 50 of the housing, whereafter the latter snaps back slightly radially inwardly to retain outlet tube 44, with sealing therebetween provided by O-ring 52. Outlet tube 44 extends from air outlet 28 of the housing and conducts air therefrom to an internal combustion engine of a truck, or the like.

Figure 2:
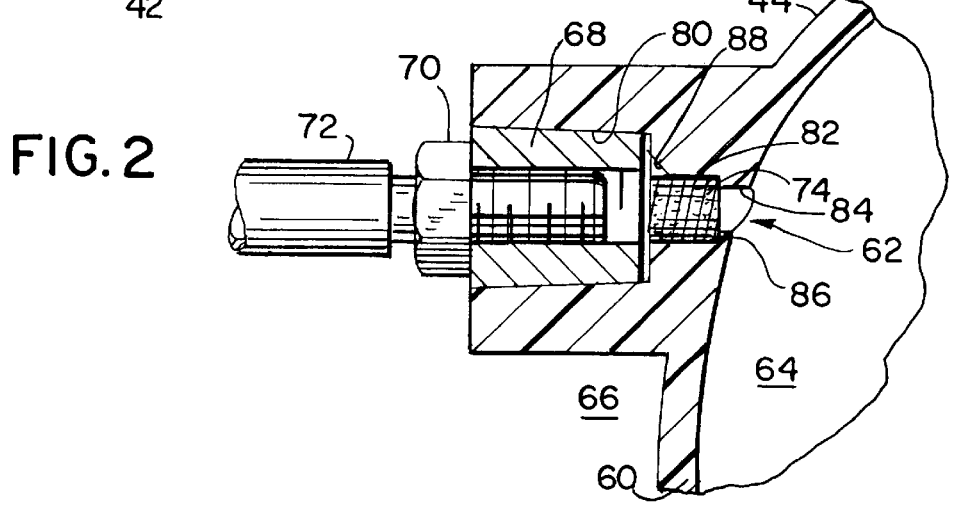
FIG. 2 is an enlarged sectional view taken along line 2—2 of FIG. 1.

Plastic outlet tube 44 has a sidewall 60, FIG. 2, with a pressure tap opening 62 therethrough communicating between the interior 64 and exterior 66 of plastic outlet tube 44, for sensing pressure in the latter. Opening 62 may also provide a vent outlet opening. A fitting 68 is provided in pressure tap opening 62 and is affixed to plastic outlet tube 44, for receiving a pressure sensor connector 70 connected to a pressure sensor (not shown) by hose 72. An auxiliary filter element 74 is provided in pressure tap opening 62 and is affixed to plastic outlet tube 44 and is unaffixed to fitting 68, such that auxiliary filter element 74 remains in pressure tap opening 62 if fitting 68 becomes dislodged from plastic outlet tube 44 and falls out of pressure tap opening 62, such that auxiliary filter element 74 continues to protect the interior 64 of outlet tube 44 and the clean side 38 of main filter element 30 and eliminates a possible contaminating bypass thereto through pressure tap opening 62.

Figure 4:
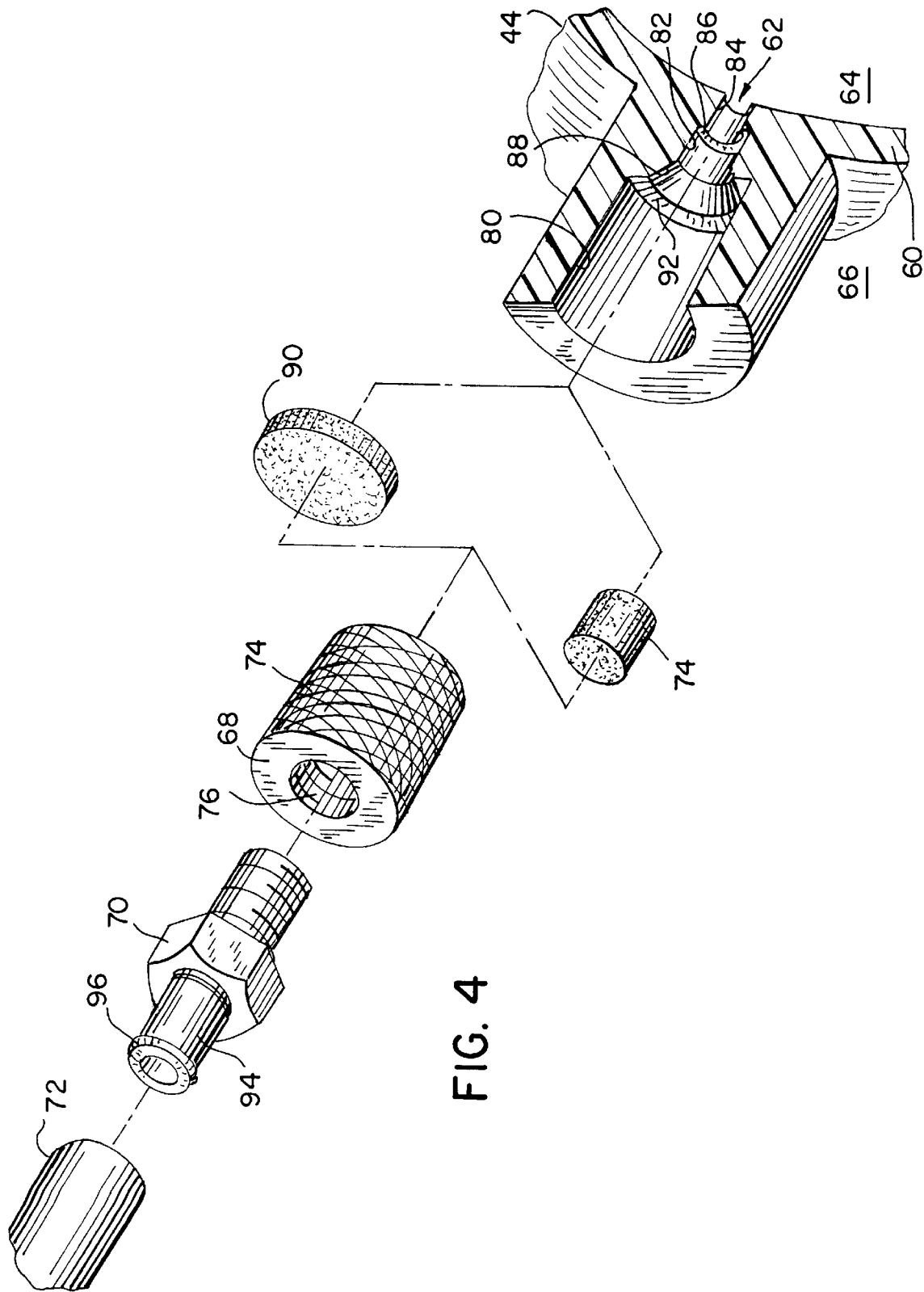
FIG. 4 is an exploded perspective view of the structure of FIGS. 2 and 3.

Fitting 68 is preferably a metal such as brass and is bonded to plastic outlet tube 44, preferably by sonic welding and/or external knurling, as shown at 74, FIG. 4, of fitting 68 and interference fit into the plastic outlet tube, though other materials and bonding techniques may be used. Metal fitting 68 is internally threaded, as shown at 76, FIG. 4, for receiving threaded pressure sensor connector 70 in torqued relation. When pressure sensor 70 is not in use, it may be closed by a cap, or it may be removed from fitting 68 and replaced by a threaded plug or bolt 78, FIG. 1, threaded into fitting 68 in torqued relation. Metal fitting 68 is subject to being overtorqued from connector 70 or plug 78, breaking the bond between plastic outlet tube 44 and metal fitting 68 due to the lower tensile strength of the plastic. Even if fitting 68 becomes dislodged and falls out of opening 62, auxiliary filter 74 remains in place because it is attached to the plastic outlet tube, and is not part of fitting 68 nor otherwise attached thereto. Auxiliary filter element 74 is preferably attached to plastic outlet tube 44 by interference pressfit. In another embodiment, auxiliary filter element 74 is a sintered metal filter sonically welded to plastic outlet tube 44 in opening 62. Other attachment techniques may be used, such as mechanical staking, adhesive bonding, etc.

Auxiliary filter element 74 is in pressure tap opening 62 between fitting 68 and the interior 64 of plastic outlet tube 44. Pressure tap opening 62 has a first section 80, FIG. 2, of a first diameter and extending inwardly through the sidewall from the exterior of plastic outlet tube 44. Pressure tap opening 62 has a second section 82 of a second diameter and extending outwardly through the sidewall from the interior 64 of plastic outlet tube 44. The noted first diameter is greater than the noted second diameter. Fitting 68 is in first section 80. Auxiliary filter element 74 is in second section 82. Pressure tap opening 62 has a third section 84 of a third diameter and extending through the sidewall between second section 82 and the interior 64 of plastic outlet tube 44. The noted second diameter is greater than the noted third diameter. Second and third sections 82 and 84 meet at an annular shoulder 86 such that shoulder 86 provides a stop preventing entry of auxiliary filter element 74 into interior 64 of plastic outlet tube 44 and the clean side 38 of main filter element 30. Pressure tap opening 62 has a fourth section 88 extending through the sidewall between sections 80 and 82 and defined by a frustoconical taper. Auxiliary filter element 74 is also in section 88.

Figure 3:
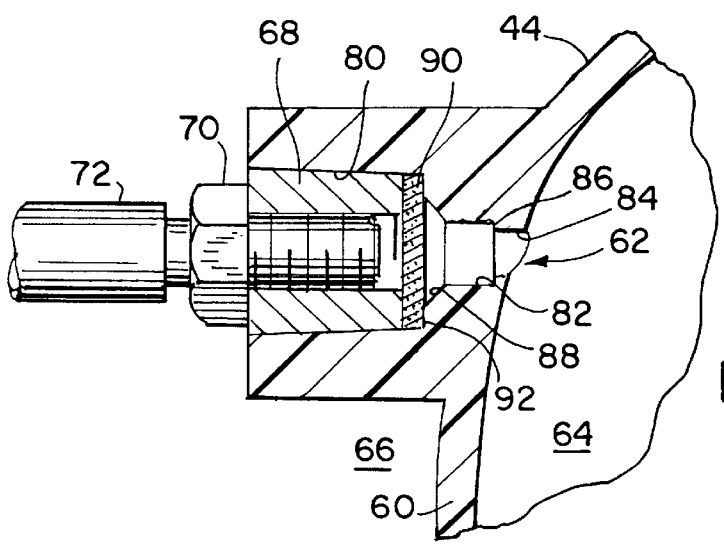
FIG. 3 is a view like FIG. 2 and shows an alternate embodiment.

FIG. 3 shows another embodiment, and uses like reference numerals as above where appropriate to facilitate understanding. Auxiliary filter element 90 is shorter and wider and more disc-like than auxiliary filter element 74, FIG. 4. Auxiliary filter element 90 is in section 80. Pressure tap opening 62 has an annular shoulder 92 between sections 80 and 82. Auxiliary filter element 90 is stopped against annular shoulder 92 such that shoulder 92 provides a stop preventing entry of auxiliary filter element 90 into interior 64 of plastic outlet tube 44 and the clean side 38 of main filter element 30. Auxiliary filter element 90 is trapped between fitting 68 and annular shoulder 92. Section 88 is defined by the noted frustoconical taper having a smallest diameter equal to the diameter of section 82 and merging therewith, and having a largest diameter less than the diameter of section 80 and merging with shoulder 92 at section 80.

In a further embodiment, members 68 and 70 are a single integral piece having an outwardly extending tube at 94, FIG. 4, with an annular bead 96, barbs, or the like, receiving and retaining a pressure sensor connector provided by hose 72.

It is recognized that various equivalents, alternatives and modifications are possible within the scope of the appended claims.

We claim:

1. An air filter comprising:
 a housing having an air inlet and an air outlet;
 a main filter element in said housing and filtering air passing from said air inlet to said air outlet, said main filter element having a dirty side receiving air from said air inlet, and having a clean side passing filtered air to said air outlet;
 a plastic outlet tube extending from said air outlet and conducting air therefrom, said outlet tube having a sidewall with a pressure tap opening therethrough communicating between the interior and exterior of said plastic outlet tube, for sensing pressure in said plastic outlet tube;
 a fitting in said pressure tap opening and affixed to said plastic outlet tube, for receiving a pressure sensor connector;
 an auxiliary filter element in said pressure tap opening and affixed to said plastic outlet tube and unaffixed to said fitting such that said auxiliary filter element remains in said pressure tap opening if said fitting becomes dislodged from said plastic outlet tube and falls out of said pressure tap opening, such that said auxiliary filter element continues to protect said clean side of said main filter element and eliminates a possible contaminating bypass thereto through said pressure tap opening.

2. The air filter according to claim 1 wherein said fitting is metal and is bonded to said plastic outlet tube, the bond between said metal fitting and said plastic outlet tube being subject to breakage due to lower tensile strength of the latter.

3. The air filter according to claim 2 wherein said metal fitting receives said pressure sensor connector in torqued relation, and wherein said metal fitting is subject to overtorquing from said connector breaking said bond between said plastic outlet tube and said metal fitting due to said lower tensile strength of said plastic outlet tube.

4. The air filter according to claim 2 wherein said metal fitting is bonded to said plastic outlet tube by sonic welding.

5. The air filter according to claim 2 wherein said metal fitting is bonded to said plastic outlet tube by interference fit.

6. The air filter according to claim 5 wherein said metal fitting is externally knurled.

7. The air filter according to claim 2 wherein said auxiliary filter element is in said pressure tap opening between said fitting and said interior of said plastic outlet tube.

8. The air filter according to claim 7 wherein said pressure tap opening has a first section of a first diameter and extending inwardly through said sidewall from said exterior of said plastic outlet tube, and a second section of a second diameter and extending outwardly through said sidewall from said interior of said plastic outlet tube, said first diameter being greater than said second diameter, said fitting being in said first section.

9. The air filter according to claim 8 wherein said auxiliary filter element is in said second section.

10. The air filter according to claim 9 wherein said pressure tap opening has a third section of a third diameter and extending through said sidewall between said second section and said interior of said plastic outlet tube, said second diameter is greater than said third diameter, said second and third sections meet at an annular shoulder, said auxiliary filter element is stopped against said annular shoulder such that said annular shoulder provides a stop preventing entry of said auxiliary filter element into said interior of said plastic outlet tube and said clean side of said main filter element.

11. The air filter according to claim 10 wherein said auxiliary filter element is pressfit in said second section.

12. The air filter according to claim 10 wherein said pressure tap opening has a fourth section extending through said sidewall between said first and second sections and defined by a frustoconical taper, said auxiliary filter element also being in said fourth section.

13. The air filter according to claim 8 wherein said auxiliary filter element is in said first section.

14. The air filter according to claim 13 wherein said pressure tap opening has an annular shoulder between said first and second sections, said auxiliary filter element is stopped against said annular shoulder such that said annular shoulder provides a stop preventing entry of said auxiliary filter element into said interior of said plastic outlet tube and said clean side of said main filter element.

15. The air filter according to claim 14 wherein said auxiliary filter element is trapped between said fitting and said annular shoulder.

16. The air filter according to claim 8 wherein said pressure tap opening has a third section of a third diameter and extending through said sidewall between said second section and said interior of said plastic outlet tube, said second diameter is greater than said third diameter, said second and third sections meet at a first annular shoulder, and wherein said pressure tap opening has a fourth section extending through said sidewall between said first and second sections and defined by a frustoconical taper having a smallest diameter equal to said second diameter and merging with said second section, said frustoconical taper having a largest diameter less than said first diameter and merging with a second annular shoulder at said first section.

* * * * *